No. 832,325. PATENTED OCT. 2, 1906.
N. KINER.
HARROW.
APPLICATION FILED APR. 17, 1906.
2 SHEETS—SHEET 2.
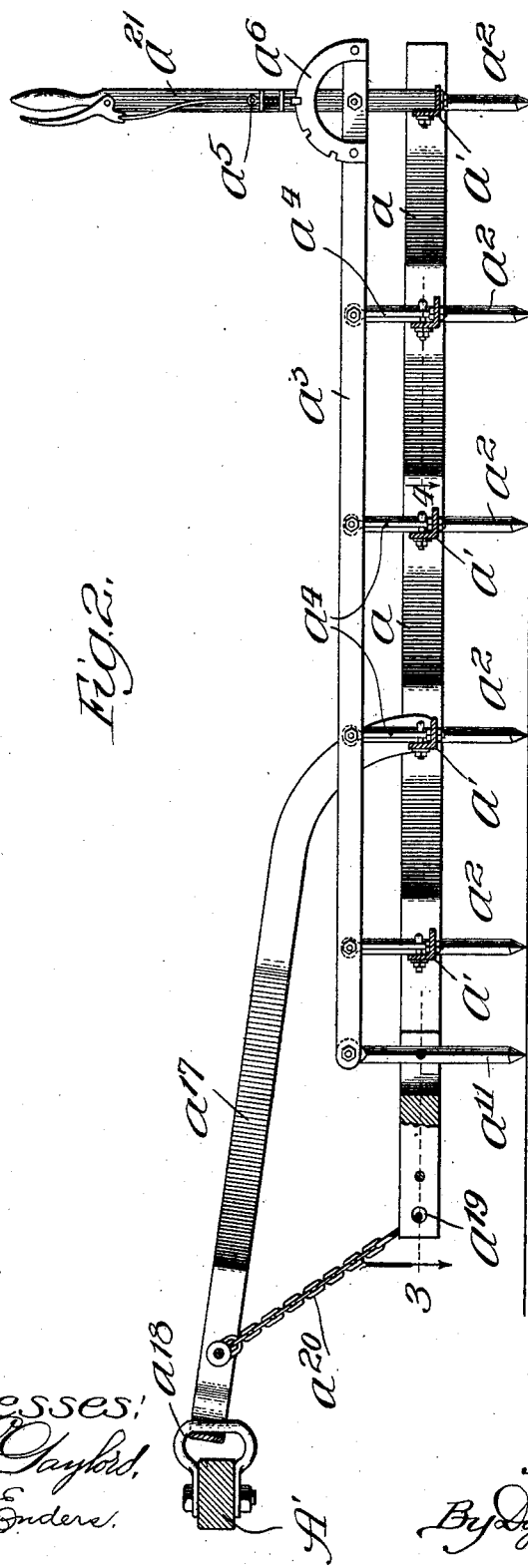
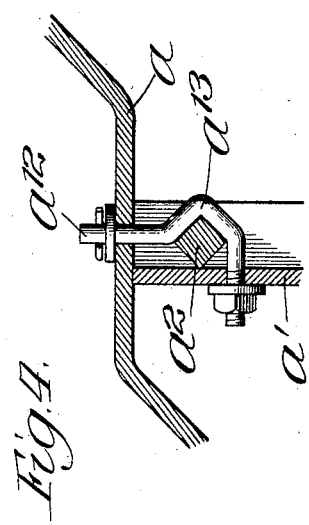
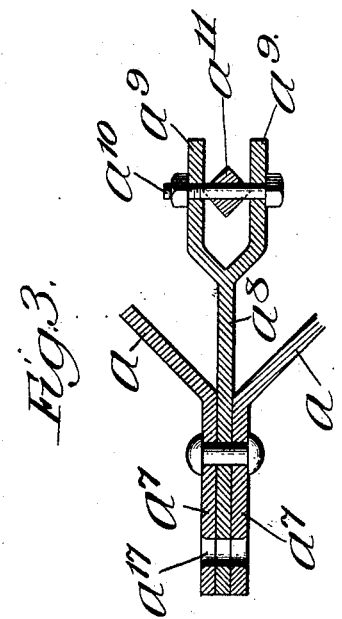
Witnesses:
Earl E. Gaylord,
John Enders.
Inventor:
Nelson Kiner,
By Dyrenforth, Dyrenforth & Lee,
Attys.

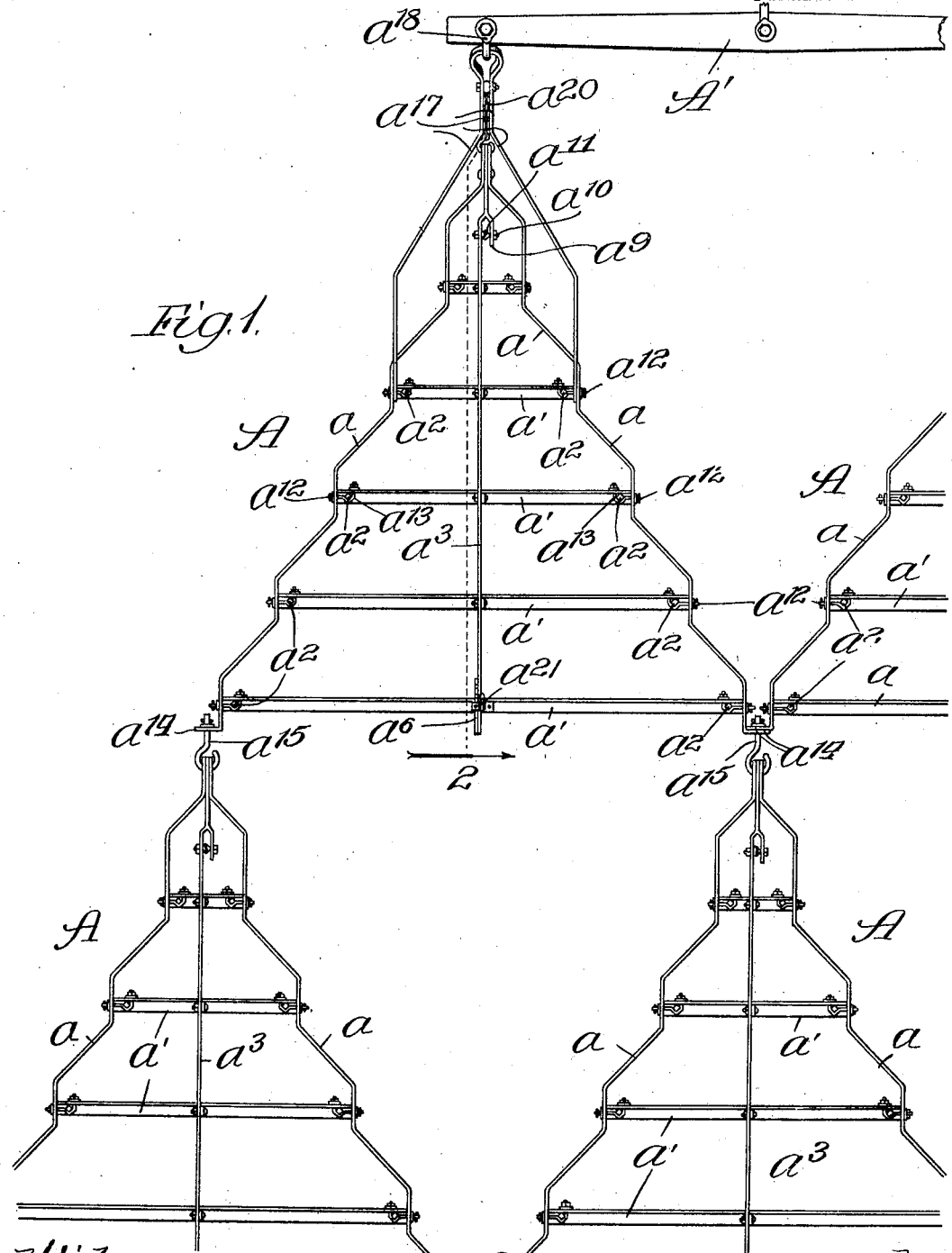

UNITED STATES PATENT OFFICE.

NELSON KINER, OF MARSEILLES, ILLINOIS, ASSIGNOR TO ISAAC G. OSGOOD AND BEMAN F. OSGOOD, OF MARSEILLES, ILLINOIS.

HARROW.

No. 832,325.   Specification of Letters Patent.   Patented Oct. 2, 1906.

Application filed April 17, 1906. Serial No. 312,130.

*To all whom it may concern:*

Be it known that I, NELSON KINER, a citizen of the United States, residing at Marseilles, in the county of Lasalle and State of Illinois, have invented a new and useful Improvement in Harrows, of which the following is a specification.

My invention relates particularly to harrows composed of a plurality of triangular sections, each section equipped with teeth and the several sections flexibly joined together, whereby the harrow may accommodate itself to the surface of the ground over which it may be moving.

My primary object is to provide a thoroughly practical construction of the character indicated, making provision therein for the adjustment of the teeth as regards inclination and making provision also for a desirable flexibility in the connections between the harrow-sections and the evener or draw-bar.

The invention is illustrated in its preferred embodiment in the accompanying drawings, in which—

Figure 1 represents a broken plan view of a harrow constructed in accordance with my invention; Fig. 2, a vertical sectional view of one of the harrow-sections, the view being taken as indicated at line 2 of Fig. 1; Fig. 3, a broken horizontal section taken as indicated at line 3 of Fig. 2, and Fig. 4 a broken horizontal section taken as indicated at line 4 of Fig. 2.

The harrow comprises, in the construction shown, a plurality of triangular harrow-sections A, flexibly connected together, and a draw-bar or evener A', flexibly connected with the foremost harrow-sections. It will be understood that any desired number of harrow-sections may be employed. Thus in Fig. 1 I have illustrated a portion of a harrow comprising five harrow-sections, the two forward sections of which are connected with the draw-bar A' and the three rearward sections of which are connected at their forward points with the rear angles of the forward sections.

Each section comprises a pair of rearwardly-divergent zigzag side members $a$, a series of rotatable cross-bars $a'$ journaled therein, said cross-bars increasing in length from the front to the rear of the section, teeth $a^2$, connected with the cross-bars, a longitudinally-disposed horizontal bar $a^3$, located above the longitudinal center of the section and equipped with a series of pivotally-joined arms $a^4$, whose lower ends are rigidly connected with the cross-bars, and a hand-lever $a^{21}$, having its lower end rigidly joined to the rearmost cross-bar, said hand-lever being equipped with a locking-pawl $a^5$, working upon a segment $a^6$, rigidly connected with the rear end of the bar $a^3$. The bars $a$ are preferably flat metal bars bent to the zigzag form illustrated. The forward ends of said bars comprise parallel sections $a^7$, between which is interposed a member $a^8$, Fig. 3, having a bifurcated head $a^9$, which is equipped with a transverse bolt $a^{10}$, upon which is journaled a harrow-tooth $a^{11}$, whose upper end is pivotally joined to the front end of the bar $a^3$. The tooth $a^{11}$ forms an apex tooth of the section, and each cross-bar in the rear thereof preferably has a tooth near each end thereof, so that teeth are arranged in rearwardly-divergent rows, as indicated in Fig. 1.

Each cross-bar preferably comprises an angle-bar having an upturned flange and a rearwardly-turned flange, the rearwardly-turned flange being perforated to receive the teeth. Each cross-bar is received between two parallel portions of the side members $a$, the ends of the bar being joined to the side members by pivots $a^{12}$, formed integrally with clamping members $a^{13}$, which engage the teeth above the horizontal flange of the cross-bar and pass through the vertical flange of the cross-bar, as shown in detail in Fig. 4. The connection is made by taking a short rod and bending it to the form shown in Fig. 4 and threading the extremity which passes through the vertical flange of the cross-bar and applying a nut thereto and employing a cotter-pin in connection with the pivotal portion $a^{12}$. This gives a strong, durable, and cheap connection.

The rear ends of the members $a$ have outturned portions $a^{14}$, which serve as a means of connection between the several sections. The apices of the rearmost sections are joined by eyebolts $a^{15}$ to the portions $a^{14}$ of the members $a$ of the advance sections, the central eyebolt forming at the same time a pivotal connection between the rear portions of the advance harrow-sections. The rear angles of the rearmost harrow-section are joined by bolts $a^{16}$. Each advance section is connected by a yoke $a^{17}$ with a clevis $a^{18}$, with which the extremity of the draw-bar A' is equipped. The arms of the yoke have their rear ends curved downwardly and joined to the pivots of the second cross-bar $a'$. As shown in Figs. 2 and 3, the front ends of the members $a$ of the advance harrow-sections are provided with perforations $a^{19}$, with which are connected chains $a^{20}$, whose upper ends are joined to the yokes $a^{17}$ near the front ends thereof. The chains serve to limit the drop of the apices of the advance sections of the harrow, it being understood that the draw-bar A' is normally maintained while the harrow is in use in about the position indicated in Fig. 2.

In use the harrow-teeth may occupy a vertical position, as shown in Fig. 2, or the lever $a^{21}$ may be shifted forwardly to give the teeth an inclination, as desired. The disposition of the teeth of the harrow-sections in divergent lines is calculated to enable the harrow to clear itself from stalks or other rubbish which may be encountered. The arrangement of the cross-bars with the vertical flange in front tends to prevent dirt from accumulating on the cross-bars and thus making the harrow unduly heavy.

What I regard as new, and desire to secure by Letters Patent, is—

1. A harrow comprising sections, each section consisting of rearwardly-divergent side bars having zigzag form, cross-bars journaled between said side bars, teeth carried by said cross-bars, and means for turning the cross-bars to adjust the inclination of the teeth, for the purpose set forth.

2. A harrow comprising sections, each section comprising a pair of rearwardly-divergent bar-form members, a series of cross-bars increasing in length from the forward part to the rear part of the section, pivotal connections between said cross-bars and side members, arms rigid with said cross-bars, a longitudinal bar pivotally connected with said arms, and a lever pivotally connected with said longitudinal bar and rigidly connected with one of the cross-bars.

3. A harrow comprising a plurality of sections, each section comprising a pair of rearwardly-divergent zigzag-form side members, a series of cross-bars located between said side members, means for simultaneously turning said cross-bars, teeth connected with the cross-bars, and clips joining said teeth to the cross-bars and having pivotal portions forming the connections between the cross-bars and side members.

4. A harrow comprising a plurality of sections, each section comprising a pair of rearwardly-divergent side members of zigzag form, cross-bars arranged between the parallel portions of the side members, teeth connected with said cross-bars near their ends, clips securing said teeth to the cross-bars and having pivotal portions journaled in the side members, arms rigidly connected with the central portions of the cross-bars, a longitudinal bar pivotally connected with said arms and equipped with a segment, and a lever pivotally connected with said longitudinal bar and rigidly connected with the rearmost cross-bar of the section, said lever having a pawl coacting said segment.

5. A harrow-section comprising a pair of rearwardly-divergent side members, a series of cross-bars pivotally connected with said side members, teeth connected with said cross-bars near the ends thereof, a series of arms rigidly connected with the central portions of the cross-bars, an apex tooth supported on a pivot, a longitudinal bar pivotally connected with said arms and with said apex tooth, and means for shifting said longitudinal bar, thereby to change the inclination of the teeth.

NELSON KINER.

In presence of—
LUTHER P. OSGOOD,
J. H. LANDES.